US012379494B2

(12) United States Patent
Yamauchi et al.

(10) Patent No.: US 12,379,494 B2
(45) Date of Patent: Aug. 5, 2025

(54) OPTICAL DISTANCE MEASUREMENT DEVICE AND MACHINING DEVICE

(71) Applicant: Mitsubishi Electric Corporation, Tokyo (JP)

(72) Inventors: Takanori Yamauchi, Tokyo (JP); Hiroki Goto, Tokyo (JP); Kiyoshi Onohara, Tokyo (JP); Naoki Suzuki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 812 days.

(21) Appl. No.: 17/697,189

(22) Filed: Mar. 17, 2022

(65) Prior Publication Data
US 2022/0206145 A1 Jun. 30, 2022

Related U.S. Application Data

(63) Continuation of application No. PCT/JP2019/041084, filed on Oct. 18, 2019.

(51) Int. Cl.
*G01S 17/08* (2006.01)
*G01B 9/02* (2022.01)
(Continued)

(52) U.S. Cl.
CPC ............... *G01S 17/08* (2013.01); *G01B 9/02* (2013.01); *G01S 7/4817* (2013.01); *G01S 17/34* (2020.01)

(58) Field of Classification Search
CPC .... G01B 9/02; G01B 9/0207; G01B 9/02072; G01B 9/02075; G01S 7/4817; G01S 17/08; G01S 17/34
See application file for complete search history.

(56) References Cited

U.S. PATENT DOCUMENTS 6,219,144 B1 * 4/2001 Hill .................... G01N 21/45
356/487
6,411,371 B1 6/2002 Hinderling et al.
(Continued)

FOREIGN PATENT DOCUMENTS

CN 105509637 A * 4/2016 ............. G01B 11/02
EP 1058810 A1 * 12/2000 ......... G01B 9/02002
(Continued)

OTHER PUBLICATIONS

First Examination Report issued Jul. 27, 2022 in corresponding Indian Patent Application No. 202247012689 with English Translation.
(Continued)

*Primary Examiner* — Michael A Lyons
(74) *Attorney, Agent, or Firm* — Birch, Stewart, Kolasch & Birch, LLP

(57) ABSTRACT

A first optical path length from an emission surface of a first optical system to a reflection surface of a target object is calculated on the basis of first reflected light received by the first optical system and reference light generated by a splitter. A second optical path length from an emission surface of the second optical system to a reflection surface of a reflector is calculated on the basis of second reflected light reflected by the reflector and received by the second optical system and the reference light generated by the splitter A refractive index of a space is calculated on the basis of the second optical path length, and a distance from the emission surface of the first optical system to the reflection surface of the target object is calculated on the basis of the refractive index and the first optical path length.

6 Claims, 7 Drawing Sheets

(51) Int. Cl.
G01S 7/481 (2006.01)
G01S 17/34 (2020.01)

(56) References Cited

U.S. PATENT DOCUMENTS

| | | | |
|---|---|---|---|
| 9,857,160 B1* | 1/2018 | Hoffer, Jr. | G01B 9/02028 |
| 2008/0144042 A1 | 6/2008 | Tanaka | |
| 2010/0027026 A1* | 2/2010 | Miyata | G01B 9/0207 |
| | | | 356/487 |

FOREIGN PATENT DOCUMENTS

| | | |
|---|---|---|
| JP | 2008-151542 | 7/2008 |
| JP | 2012-2604 A | 1/2012 |

OTHER PUBLICATIONS

Masamitsu Haruna, "Optical Coherence Tomography (OCT)," Medical Photonics, vol. 1, 2010, total 7 pages. http://www.medicalphotonics.jp/pdf/mp0001/0001_029.pdf.

* cited by examiner

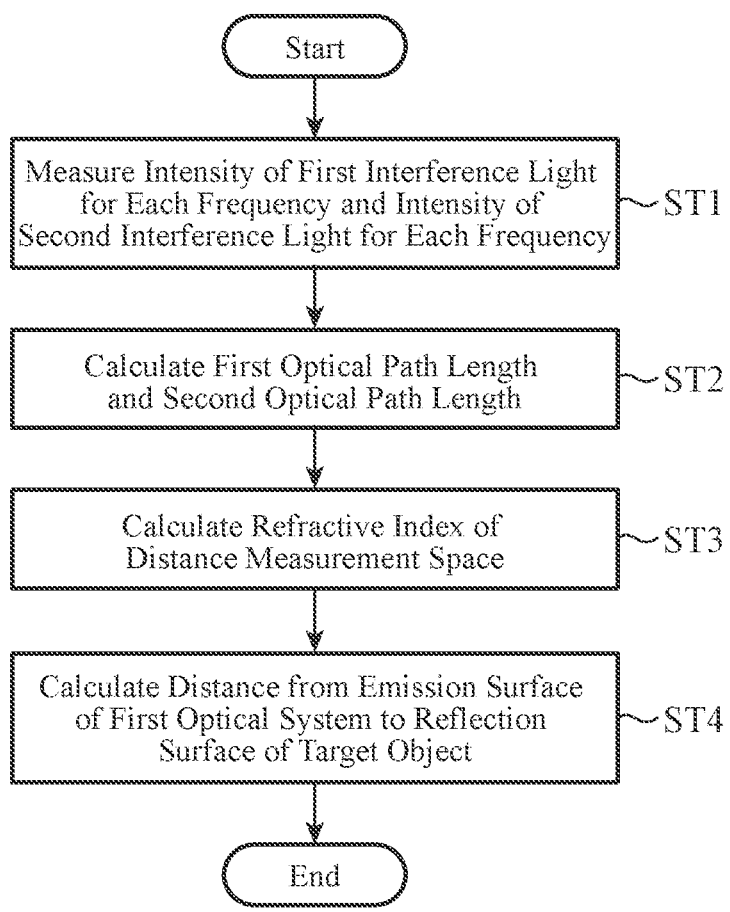

OPTICAL DISTANCE MEASUREMENT DEVICE AND MACHINING DEVICE

CROSS REFERENCE TO RELATED APPLICATIONS

This application is a Continuation of PCT International Application No. PCT/JP2019/041084, filed on Oct. 18, 2019, which is hereby expressly incorporated by reference into the present application.

TECHNICAL FIELD

The present invention mainly relates to an optical distance measurement device.

BACKGROUND ART

Conventionally, an optical distance measurement device is known which measures, using light emitted from a light source, the distance from a predetermined position in the optical path of the light to the position of a target object (see, for example, Patent Literature 1.). The method used by the optical distance measurement device to measure the distance is, for example, a pulse propagation method, a triangulation method, a confocal method, white-light interferometry, wavelength scanning interferometry, or the like. Among these methods, the white-light interferometry, the wavelength scanning interferometry, and the like are interferometry using an interference phenomenon of light.

In the interferometry, light emitted from a light source is split into measurement light and reference light, interference light is generated by causing the reference light and reflected light obtained by reflecting the measurement light on a target object to interfere with each other, and an optical path length from a predetermined position in an optical path of the measurement light to the position of the target object is calculated on the basis of the interference light.

For example, the white-light interferometry such as spectral domain interferometry uses a light source that emits broadband light. An optical distance measurement device using the white-light interferometry disperses interference light by a spectroscope to generate interference light spatially separated for each frequency, and calculates an optical path length from a predetermined position in an optical path of measurement light to the position of a target object on the basis of the interference light.

The wavelength scanning interferometry uses, for example, wavelength-swept light having a wavelength that varies over time. In an optical distance measurement device using the wavelength scanning interferometry, an optical path length from a predetermined position in an optical path of measurement light to the position of a target object is calculated on the basis of interference light generated by causing interference between reflected light of the wavelength-swept light and reference light of the wavelength-swept light.

An optical path length is equal to the product of a refractive index and an actual distance. Therefore, the optical path length calculated by the optical distance measurement device as described above needs to be converted into the distance from the predetermined position in the optical path of the measurement light to the position of the target object on the basis of the refractive index of a substance through which the measurement light passes from the predetermined position in the optical path of the measurement light to the position of the target object.

CITATION LIST

Patent Literature

Patent Literature 1: JP 2012-2604 A

SUMMARY OF INVENTION

Technical Problem

However, in a case where the refractive index of the space between an optical element that irradiates the target object with the measurement light and the target object that reflects the measurement light changes, the changed refractive index is different from the refractive index that has been used to convert the optical path length into the distance, and thus, there is a problem that the distance measurement accuracy decreases. Note that, in the following, such a space is referred to as a distance measurement space.

For example, the refractive index of air in the distance measurement space changes according to the temperature of the air. Further, the refractive index of air in such a space changes in accordance with a change in atmospheric pressure. In addition, when the optical distance measurement device is installed in a machining device that machines a target object, a mist of machining oil scatters in the distance measurement space during machining, so that the refractive index of the distance measurement space changes.

The present invention has been accomplished to solve the above problem, and an object of the present invention is to provide an optical distance measurement device capable of suppressing a decrease in distance measurement accuracy due to a change in refractive index of the distance measurement space.

Solution to Problem

The optical distance measurement device according to the present invention includes: a splitter to split laser light into measurement light and reference light; a measurement light splitter to split the measurement light generated by the splitter into first measurement light and second measurement light; a first optical system to irradiate a target object with the first measurement light generated by the measurement light splitter and to receive first reflected light reflected by the target object; a second optical system to emit the second measurement light generated by the measurement light splitter toward a space between the first optical system and the target object; a reflector to reflect the second measurement light emitted from the second optical system and passing through the space toward the second optical system; and processing circuitry to calculate a first optical path length from an emission surface of the first optical system to a reflection surface of the target object on the basis of the first reflected light received by the first optical system and the reference light generated by the splitter, and to calculate a second optical path length from an emission surface of the second optical system to a reflection surface of the reflector on the basis of second reflected light reflected by the reflector and received by the second optical system and the reference light generated by the splitter; and to calculate a refractive index of the space on the basis of the second optical path length, and to calculate a distance from the emission surface of the first optical system to the reflection surface of the target object on the basis of the refractive index and the first optical path length.

Advantageous Effects of Invention

According to the present invention, it is possible to suppress a decrease in distance measurement accuracy due to a change in the refractive index of the distance measurement space.

BRIEF DESCRIPTION OF DRAWINGS

FIG. 2 is a flowchart illustrating a distance measurement method performed by an analysis unit of the optical distance measurement device according to the first embodiment.

DESCRIPTION OF EMBODIMENTS

In order to describe the present invention in more detail, some modes for carrying out the present invention will now be described with reference to the accompanying drawings.

First Embodiment

Figure 1:
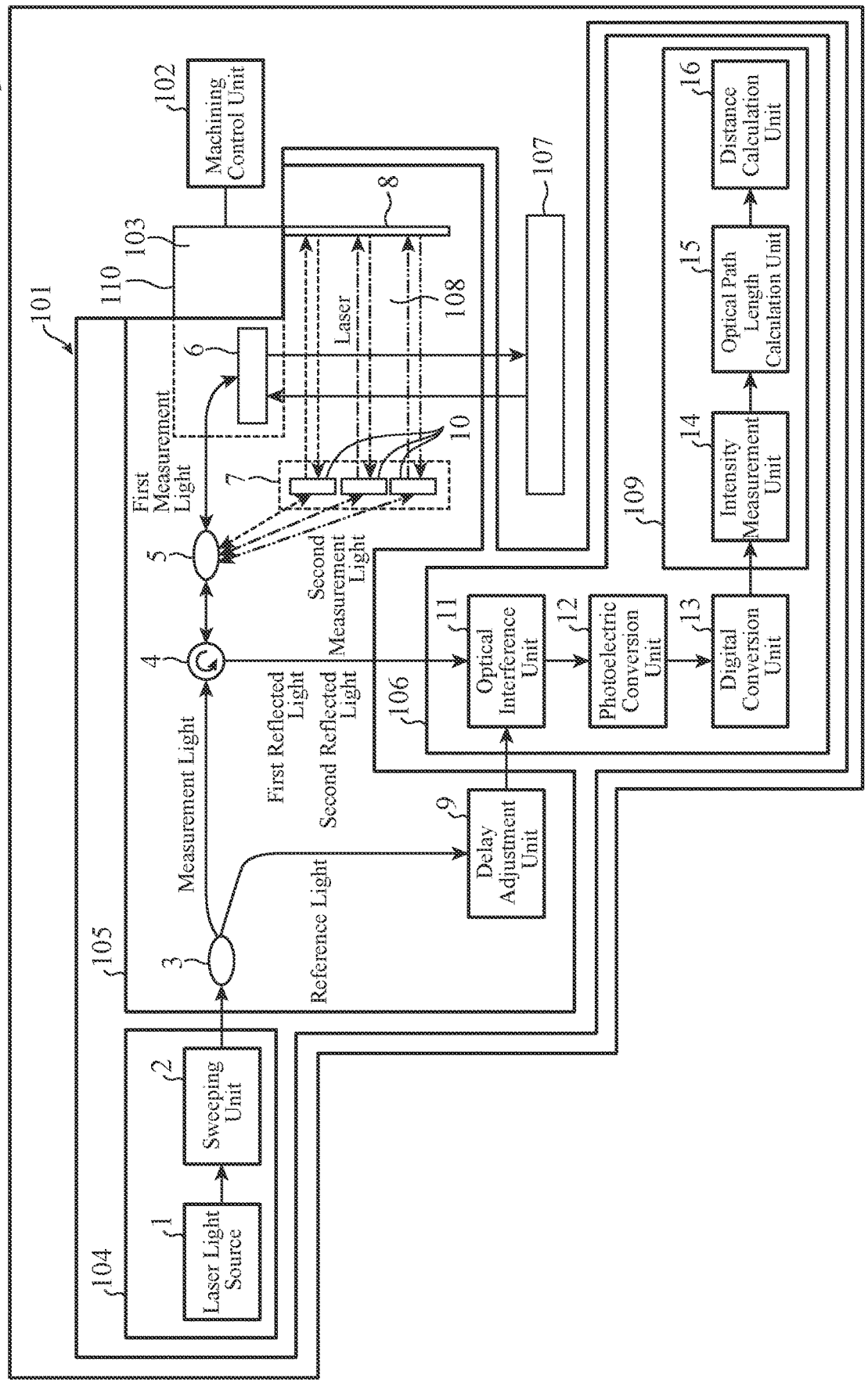
FIG. 1 is a diagram illustrating a configuration of a machining device including an optical distance measurement device according to a first embodiment.

FIG. 1 is a diagram illustrating a configuration of a machining device 100 including an optical distance measurement device 101 according to a first embodiment. Note that, although the first embodiment describes the configuration in which the optical distance measurement device 101 is installed in the machining device 100, the optical distance measurement device 101 may be installed in a device other than the machining device 100.

For example, the optical distance measurement device 101 uses wavelength scanning interferometry, and is applied to a swept-source optical coherence tomography (SS-OCT) for medical use (Masamitsu Haruna, "Optical Coherence Tomography (OCT)", [online], 2010, MEDICAL PHOTONICS, [searched on Feb. 4, 2019], Internet <URL: http://www.medicalphotonics.jp/pdf/mp0001/0001_029.pdf>).

As illustrated in FIG. 1, the machining device 100 includes the optical distance measurement device 101, a machining control unit 102, and a machining unit 103. The optical distance measurement device 101 includes a wavelength-swept-light output unit 104, an optical transmission unit 105, and a signal processing unit 106.

First, the configuration of the wavelength-swept-light output unit 104 will be described. The wavelength-swept-light output unit 104 includes a laser light source 1 and a sweeping unit 2.

The laser light source 1 emits continuous-wave laser light. The laser light emitted from the laser light source 1 is guided to the sweeping unit 2. The laser light source 1 according to the first embodiment is, for example, a gas laser, a semiconductor laser, or the like that emits laser light having a predetermined center frequency.

Note that, although the first embodiment describes the configuration in which the optical distance measurement device 101 includes the laser light source 1, the optical distance measurement device 101 may not include the laser light source 1. In that case, the optical distance measurement device 101 uses laser light emitted from an external laser light generator including the laser light source 1.

The sweeping unit 2 is disposed on an optical path of the laser light emitted from the laser light source 1. The sweeping unit 2 generates swept light by sweeping the wavelength of the laser light emitted from the laser light source. The swept light generated by the sweeping unit 2 is continuous-wave laser light having a frequency that changes over time. The swept light generated and emitted by the sweeping unit 2 is guided to a splitting unit 3.

Note that, although the first embodiment describes the configuration in which the optical distance measurement device 101 is provided with the wavelength-swept-light output unit 104 including the laser light source 1 and the sweeping unit 2, the optical distance measurement device 101 may not include the wavelength-swept-light output unit 104. In that case, the optical distance measurement device 101 uses swept light emitted from an external swept-light generator including the laser light source 1 and the sweeping unit 2.

Next, a configuration of the optical transmission unit 105 will be described. The optical transmission unit 105 includes the splitting unit 3, an optical circulator 4, a measurement light splitting unit 5, a first optical system 6, a second optical system 7, a reflection unit 8, and a delay adjustment unit 9.

The splitting unit 3 is disposed on an optical path of the swept light emitted from the sweeping unit 2. The splitting unit 3 splits the wavelength-swept light generated by the sweeping unit 2 into measurement light and reference light. More specifically, the splitting unit 3 generates measurement light and reference light, each of which is continuous-wave laser light, by splitting the wavelength-swept light that is continuous-wave laser light generated by the sweeping unit 2. The measurement light generated by the splitting unit 3 is guided to the optical circulator 4. Further, the reference light generated by the splitting unit 3 is guided to the delay adjustment unit 9.

The splitting unit 3 is, for example, an optical coupler. The measurement light generated by the splitting unit 3 is further split into a plurality of measurement light beams by the measurement light splitting unit 5 to be described later. The plurality of measurement light beams may interfere with each other. Therefore, the intensity of the measurement light generated by the splitting unit 3 is preferably sufficiently lower than the intensity of the reference light generated by the splitting unit 3 to an extent that the interference between the plurality of measurement light beams does not affect distance measurement in a distance measurement space 108 described later.

Note that the optical distance measurement device 101 may include, as the splitting unit 3, an optical switch capable of switching the optical path of laser light at high speed. In that case, the optical switch guides the measurement light to the optical circulator 4 by switching the optical path of the swept light to the optical path from the optical switch to the optical circulator 4, or guides the reference light to the delay adjustment unit 9 by switching the optical path of the swept light to the optical path from the optical switch to the delay adjustment unit 9.

The optical circulator 4 is disposed on an optical path of the measurement light generated by the splitting unit 3. The optical circulator 4 guides the measurement light generated by the splitting unit 3 to the measurement light splitting unit 5. The optical circulator 4 is, for example, a three-port optical circulator.

The measurement light splitting unit 5 is disposed on an optical path of the measurement light emitted from the optical circulator 4. The measurement light splitting unit 5 splits the measurement light generated by the splitting unit 3 into first measurement light and second measurement light. More specifically, the measurement light splitting unit 5 splits the measurement light which is continuous-wave laser light generated by the splitting unit 3, thereby generating the first measurement light and the second measurement light each of which is continuous-wave laser light. The first measurement light generated by the measurement light splitting unit 5 is guided to the first optical system 6. Further, the second measurement light generated by the measurement light splitting unit 5 is guided to the second optical system 7.

In the first embodiment, the second optical system 7 includes a plurality of optical elements 10 as described later. Therefore, in the first embodiment, the measurement light splitting unit 5 generates the first measurement light and the same number of second measurement light beams as the plurality of optical elements 10 by splitting the measurement light generated by the splitting unit 3.

The first optical system 6 is disposed on an optical path of the first measurement light emitted from the measurement light splitting unit 5. In the first embodiment, the first optical system 6 constitutes a machining head unit 110 together with the machining unit 103 described later. The machining head unit 110 moves relative to a target object 107 under the control of the machining control unit 102 when the machining unit 103 machines the target object 107. The first optical system 6 irradiates the target object 107 with the first measurement light emitted by the measurement light splitting unit 5, and receives first reflected light reflected by the target object 107.

More specifically, the first optical system 6 includes, for example, at least one or more lenses. Examples of the lens include a transmission lens that transmits and refracts laser light and a reflection lens using a mirror. For example, the first optical system 6 widens the light flux diameter of the first measurement light by these lenses, and irradiates the target object 107 with the first measurement light having the widened light flux diameter.

The first measurement light emitted to the target object 107 is reflected by the target object 107. Next, the first optical system 6 receives the first reflected light reflected by the target object 107. Next, the first reflected light received by the first optical system 6 is guided to the measurement light splitting unit 5 and guided to the optical circulator 4. Then, the optical circulator 4 guides the first reflected light guided from the measurement light splitting unit 5 to an optical interference unit 11 described later.

The second optical system 7 is disposed on an optical path of the second measurement light emitted from the measurement light splitting unit 5. The second optical system 7 emits the second measurement light generated by the measurement light splitting unit 5 toward the distance measurement space 108 which is a space between the first optical system 6 and the target object 107.

In the first embodiment, the second optical system 7 includes the plurality of optical elements 10. The plurality of optical elements 10 is arranged along an axis parallel to the optical axis of the first optical system 6. In addition, the optical axis of each of the plurality of optical elements 10 is orthogonal to the optical axis of the first optical system. Each of the plurality of optical elements 10 emits the second measurement light generated by the measurement light splitting unit 5 toward the distance measurement space 108.

More specifically, the optical element 10 is, for example, a lens, and the second optical system 7 includes, for example, at least one or more lenses. Examples of the lens include a transmission lens that transmits and refracts laser light and a reflection lens using a mirror. For example, the second optical system 7 widens the light flux diameter of the second measurement light by these lenses, and emits the second measurement light having the widened light flux diameter toward the distance measurement space 108.

The reflection unit 8 is disposed on an optical path of the second measurement light emitted from the second optical system 7. The reflection unit 8 reflects the second measurement light emitted from the second optical system 7 and passing through the distance measurement space 108 toward the second optical system 7. The reflection unit 8 is, for example, a mirror.

More specifically, in the first embodiment, the reflection unit 8 is provided so that its reflection surface is perpendicular to the optical axis of each of the plurality of optical elements 10. Therefore, the reflection unit 8 can reflect the second measurement light emitted from the optical elements 10 and passing through the distance measurement space 108 toward the optical elements 10.

The second optical system 7 receives second reflected light obtained by reflecting the second measurement light by the reflection unit 8. In the first embodiment, each of the plurality of optical elements 10 receives the second reflected light obtained by reflecting the emitted second measurement light by the reflection unit 8. Next, the second reflected light received by the second optical system 7 is guided to the measurement light splitting unit 5 and guided to the optical circulator 4. Then, the optical circulator 4 guides the second reflected light guided from the measurement light splitting unit 5 to the optical interference unit 11.

The delay adjustment unit 9 is disposed on an optical path of the reference light emitted from the splitting unit 3. The delay adjustment unit 9 adjusts a difference between a path length of the reference light from the splitting unit 3 to the optical interference unit 11 and a path length of the measurement light from the splitting unit 3 to the optical interference unit 11 via the target object 107 or the reflection unit 8. Thus, the delay adjustment unit 9 adjusts the frequency difference between the reference light and the first reflected light or the second reflected light in the optical interference unit 11. The reference light emitted from the delay adjustment unit 9 is guided to the optical interference unit 11.

Next, a configuration of the signal processing unit 106 will be described. The signal processing unit 106 includes the optical interference unit 11, a photoelectric conversion unit 12, a digital conversion unit 13, and an analysis unit 109.

The optical interference unit 11 is disposed at a position where the optical paths of the first reflected light and the second reflected light emitted from the optical circulator 4 intersect with the optical path of the reference light emitted from the delay adjustment unit 9. The optical interference unit 11 causes interference between the first reflected light received by the first optical system 6 and the reference light generated by the splitting unit 3, thereby generating first interference light. In the first embodiment, the optical interference unit 11 generates the first interference light by causing interference between the first reflected light emitted from the optical circulator 4 and the reference light emitted from the delay adjustment unit 9.

In addition, the optical interference unit 11 generates second interference light by causing interference between the second reflected light, which is obtained by reflecting the second measurement light by the reflection unit 8 and which is received by the second optical system 7, and the reference light generated by the splitting unit 3.

In the first embodiment, the optical interference unit 11 generates the second interference light by causing interference between the second reflected light emitted from the optical circulator 4 and the reference light emitted from the delay adjustment unit 9.

The optical interference unit 11 is, for example, a 90-degree optical hybrid that generates the first interference light by combining the first reflected light and the reference light and generates the second interference light by combining the second reflected light and the reference light. Alternatively, the optical interference unit 11 is, for example, an optical coupler.

The photoelectric conversion unit 12 is disposed on the optical paths of the first interference light and the second interference light emitted from the optical interference unit 11. The photoelectric conversion unit 12 photoelectrically converts the first interference light generated by the optical interference unit 11 to generate a first analog signal indicating a waveform of the first interference light. In addition, the photoelectric conversion unit 12 photoelectrically converts the second interference light generated by the optical interference unit 11 to generate a second analog signal indicating a waveform of the second interference light.

The first embodiment describes a configuration in which the optical distance measurement device 101 includes the optical interference unit 11 and the photoelectric conversion unit 12 as described above, but the optical distance measurement device 101 is not limited to having this configuration. For example, the optical distance measurement device 101 may include a balanced light-receiving photodiode, instead of the optical interference unit 11 and the photoelectric conversion unit 12. The balanced light-receiving photodiode includes, for example, a photodiode that generates a first signal in response to first reflected light and a photodiode that generates a second signal in response to reference light, and generates a displacement signal indicating a difference in intensity between the first reflected light and the reference light from the first signal and the second signal. Note that the distance measurement method using the displacement signal is a known technique, and thus the detailed description thereof will be omitted.

The digital conversion unit 13 performs A/D conversion on the first analog signal generated by the photoelectric conversion unit 12 to generate a first digital signal indicating the waveform of the first interference light. In addition, the digital conversion unit 13 performs A/D conversion on the second analog signal generated by the photoelectric conversion unit 12 to generate a second digital signal indicating the waveform of the second interference light.

The analysis unit 109 includes an intensity measurement unit 14, an optical path length calculation unit 15, and a distance calculation unit 16. The intensity measurement unit 14 measures the intensity of the first interference light for each frequency on the basis of the first digital signal generated by the digital conversion unit 13. The intensity measurement unit 14 outputs the measured intensity of the first interference light for each frequency to the optical path length calculation unit 15.

More specifically, the intensity measurement unit 14 measures the intensity of the first interference light for each frequency by performing Fourier transform on the first digital signal generated by the digital conversion unit 13, for example.

In addition, the intensity measurement unit 14 measures the intensity of the second interference light for each frequency on the basis of the second digital signal generated by the digital conversion unit 13. The intensity measurement unit 14 outputs the measured intensity of the second interference light for each frequency to the optical path length calculation unit 15.

More specifically, the intensity measurement unit 14 measures the intensity of the second interference light for each frequency by performing Fourier transform on the second digital signal generated by the digital conversion unit 13, for example.

The optical path length calculation unit 15 calculates a first optical path length from the emission surface of the first optical system 6 to the reflection surface of the target object 107 on the basis of the first reflected light received by the first optical system 6 and the reference light generated by the splitting unit 3. The optical path length calculation unit 15 outputs the calculated first optical path length to the distance calculation unit 16.

More specifically, the optical path length calculation unit 15 calculates the first optical path length from the emission surface of the first optical system 6 to the reflection surface of the target object 107 on the basis of the first interference light generated by the optical interference unit 11. Still more specifically, in the first embodiment, the optical path length calculation unit 15 calculates the first optical path length from the emission surface of the first optical system 6 to the reflection surface of the target object 107 on the basis of the intensity of the first interference light for each frequency measured by the intensity measurement unit 14.

In addition, the optical path length calculation unit 15 calculates a second optical path length from the emission surface of the second optical system 7 to the reflection surface of the reflection unit 8 on the basis of the second reflected light received by the second optical system and the reference light generated by the splitting unit 3. The optical path length calculation unit 15 outputs the calculated second optical path length to the distance calculation unit 16.

More specifically, the optical path length calculation unit 15 calculates the second optical path length from the emission surface of the second optical system 7 to the reflection surface of the reflection unit 8 on the basis of the second interference light generated by the optical interference unit 11. Still more specifically, in the first embodiment, the optical path length calculation unit 15 calculates the second optical path length from the emission surface of the second optical system 7 to the reflection surface of the reflection unit 8 on the basis of the intensity of the second interference light for each frequency measured by the intensity measurement unit 14.

The distance calculation unit 16 calculates the refractive index of the distance measurement space 108 on the basis of the second optical path length measured by the optical path length calculation unit 15, and calculates the distance from the emission surface of the first optical system 6 to the reflection surface of the target object 107 on the basis of the refractive index and the first optical path length measured by the optical path length calculation unit 15. The distance calculation unit 16 outputs the calculated distance to the machining control unit 102.

Note that the distance calculation unit 16 may further calculate, in addition to the above distance, a distance from a predetermined position on the optical path of the measurement light emitted from the splitting unit 3 or a predetermined position on the optical path of the first measurement light emitted from the measurement light splitting unit 5 to the reflection surface of the target object 107. The predetermined position is, for example, the position of the splitting unit 3, the position of the optical circulator 4, or the position of the measurement light splitting unit 5.

The first interference light generated by the optical interference unit 11 includes interference light generated based on a frequency difference corresponding to a distance from the splitting unit 3 to the reflection surface of the target object 107. Then, in that case, the distance calculation unit 16 calculates the distance from the emission surface of the first optical system 6 to the reflection surface of the target object 107 and the distance from the splitting unit 3 to the emission surface of the first optical system 6 on the basis of the refractive index of the distance measurement space 108 calculated based on the second optical path length, the refractive index from the splitting unit 3 to the emission surface of the first optical system 6, and the first optical path length measured by the optical path length calculation unit 15 on the basis of the interference light. The distance calculation unit 16 obtains the sum of these calculated distances and calculates the distance from the splitting unit 3 to the reflection surface of the target object 107.

The machining control unit 102 controls the machining unit 103 so that the machining unit 103 machines the target object 107 on the basis of the distance measured by the optical distance measurement device 101. The machining unit 103 machines the target object 107 under the control of the machining control unit 102. In the first embodiment, the machining unit 103 machines the target object 107 by irradiating the target object 107 with laser light under the control of the machining control unit 102. However, the machining unit 103 is not limited to having the configuration described above. For example, the machining unit 103 may machine the target object 107 by polishing or cutting the target object 107 under the control of the machining control unit 102.

Next, a distance measurement method by the analysis unit 109 of the optical distance measurement device 101 according to the first embodiment will be described with reference to the drawings. FIG. 2 is a flowchart illustrating the distance measurement method by the analysis unit 109 of the optical distance measurement device 101. Note that, it is assumed that the intensity measurement unit 14 acquires the first digital signal and the second digital signal from the digital conversion unit 13 before the analysis unit 109 executes the distance measurement method in FIG. 2.

As illustrated in FIG. 2, the intensity measurement unit 14 measures the intensity of the first interference light for each frequency on the basis of the first digital signal generated by the digital conversion unit 13, and measures the intensity of the second interference light for each frequency on the basis of the second digital signal generated by the digital conversion unit 13 (step ST1).

Next, the optical path length calculation unit 15 calculates the first optical path length from the emission surface of the first optical system 6 to the reflection surface of the target object 107 on the basis of the intensity of the first interference light for each frequency measured by the intensity measurement unit 14, and calculates the second optical path length from the emission surface of the second optical system 7 to the reflection surface of the reflection unit 8 on the basis of the intensity of the second interference light for each frequency measured by the intensity measurement unit 14 (step ST2).

Next, the distance calculation unit 16 calculates the refractive index of the distance measurement space 108 on the basis of the second optical path length measured by the optical path length calculation unit 15 (step ST3).

Next, the distance calculation unit 16 calculates the distance from the emission surface of the first optical system 6 to the reflection surface of the target object 107 on the basis of the refractive index calculated in step ST3 and the first optical path length measured by the optical path length calculation unit 15 (step ST4).

Note that the machining control unit 102 controls the machining unit 103 so that the machining unit 103 machines the target object 107 on the basis of the distance calculated by the distance calculation unit 16 in step ST4.

Each function of the intensity measurement unit 14, the optical path length calculation unit 15, and the distance calculation unit 16 in the analysis unit 109 is implemented by a processing circuit. That is, the analysis unit 109 includes a processing circuit for executing the processing from step ST1 to step ST4 illustrated in FIG. 2. The processing circuit may be dedicated hardware, or may be a central processing unit (CPU) that executes a program stored in a memory.

Figure 3A:
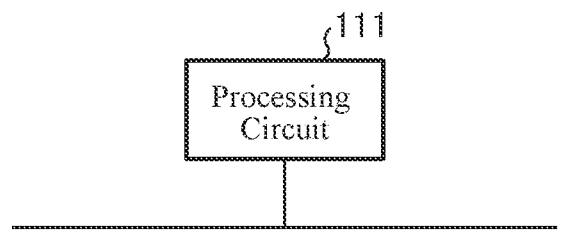
FIG. 3A is a block diagram illustrating a hardware configuration for implementing a function of the analysis unit.
Figure 3B:
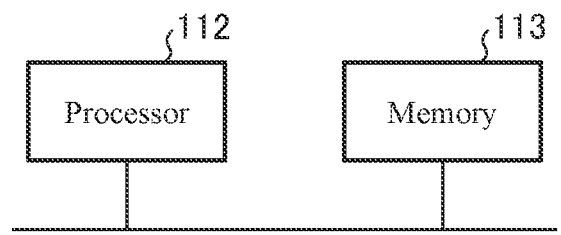
FIG. 3B is a block diagram illustrating a hardware configuration for executing software that implements the function of the analysis unit.

FIG. 3A is a block diagram illustrating a hardware configuration that implements the function of the analysis unit 109. FIG. 3B is a block diagram illustrating a hardware configuration for executing software that implements the function of the analysis unit 109.

When the processing circuit is a processing circuit 111 that is dedicated hardware illustrated in FIG. 3A, the processing circuit 111 is, for example, a single circuit, a composite circuit, a programmed processor, a parallel programmed processor, an application specific integrated circuit (ASIC), a field programmable gate array (FPGA), or a combination of some of these circuits.

Each function of the intensity measurement unit 14, the optical path length calculation unit 15, and the distance calculation unit 16 in the analysis unit 109 may be implemented by separate processing circuits, or these functions may be collectively implemented by a single processing circuit.

In a case where the processing circuit is a processor 112 illustrated in FIG. 3B, each function of the intensity measurement unit 14, the optical path length calculation unit 15, and the distance calculation unit 16 in the analysis unit 109 is implemented by software, firmware, or a combination of software and firmware.

Note that software or firmware is described as a program and stored in a memory 113.

The processor 112 reads and executes the program stored in the memory 113 to implement each function of the intensity measurement unit 14, the optical path length calculation unit 15, and the distance calculation unit 16 in the analysis unit 109. That is, the analysis unit 10) includes the memory 113 for storing programs to eventually execute the processes from step ST1 to step ST4 illustrated in FIG. 2 when being executed by the processor 112.

These programs cause a computer to execute procedures or methods performed by the intensity measurement unit 14, the optical path length calculation unit 15, and the distance calculation unit 16 in the analysis unit 109. The memory 113 may be a computer-readable storage medium storing a program for causing a computer to function as the intensity measurement unit 14, the optical path length calculation unit 15, and the distance calculation unit 16 in the analysis unit 109.

The memory 113 is, for example, a nonvolatile or volatile semiconductor memory such as random access memory (RAM), read only memory (ROM), flash memory, erasable programmable read only memory (EPROM), or electrically EPROM (EEPROM), a magnetic disk, a flexible disk, an optical disk, a compact disk, a mini disk, or a digital versatile disk (DVD).

A portion of each function of the intensity measurement unit 14, the optical path length calculation unit 15, and the distance calculation unit 16 in the analysis unit 109 may be implemented by dedicated hardware, and another portion may be implemented by software or firmware.

For example, the function of the intensity measurement unit 14 is implemented by a processing circuit as dedicated hardware. The functions of the optical path length calculation unit 15 and the distance calculation unit 16 may be implemented by the processor 112 reading and executing a program stored in the memory 113.

As described above, the processing circuit can implement each of the abovementioned functions by hardware, software, firmware, or a combination thereof.

Figure 4A:
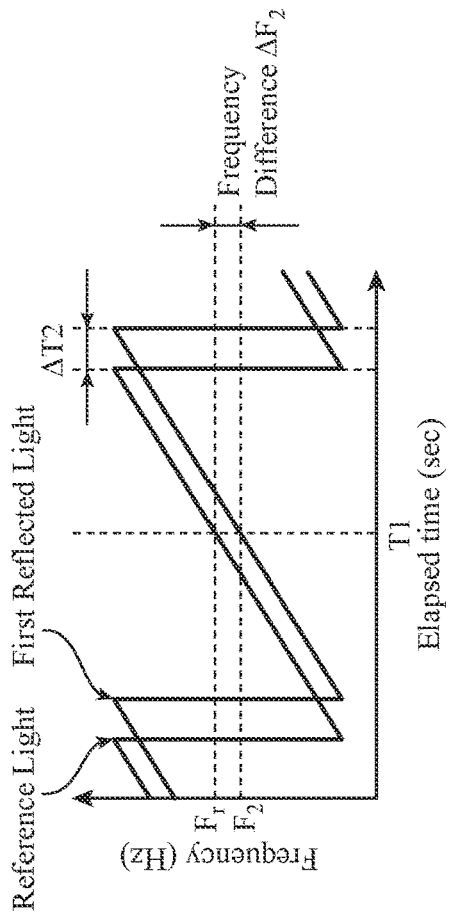
FIG. 4A is a diagram illustrating a state in which first measurement light emitted from an optical transmission unit is reflected by a reflection unit.

Next, a first specific example of the distance measurement method by the optical distance measurement device 101 according to the first embodiment will be described with reference to the drawings. FIG. 4A is a diagram illustrating a state in which the first measurement light emitted from the optical transmission unit 105 is reflected by the target object 107. FIG. 4A illustrates a first example in which the optical transmission unit 105 irradiates the target object 107 with the first measurement light when the distance from the optical transmission unit 105 to the target object 107 is $X_1$, a second example in which the optical transmission unit 105 irradiates the target object 107 with the first measurement light when the distance from the optical transmission unit 105 to the target object 107 is $X_2$, and a third example in which the optical transmission unit 105 irradiates the target object 107 with the first measurement light when the distance from the optical transmission unit 105 to the target object 107 is $X_3$. Here, the distance from the optical transmission unit 105 to the target object 107 means a distance from a predetermined position on the optical path of the measurement light emitted from the splitting unit 3 or a predetermined position on the optical path of the first measurement light emitted from the measurement light splitting unit 5 to the reflection surface of the target object 107.

Figure 4B:
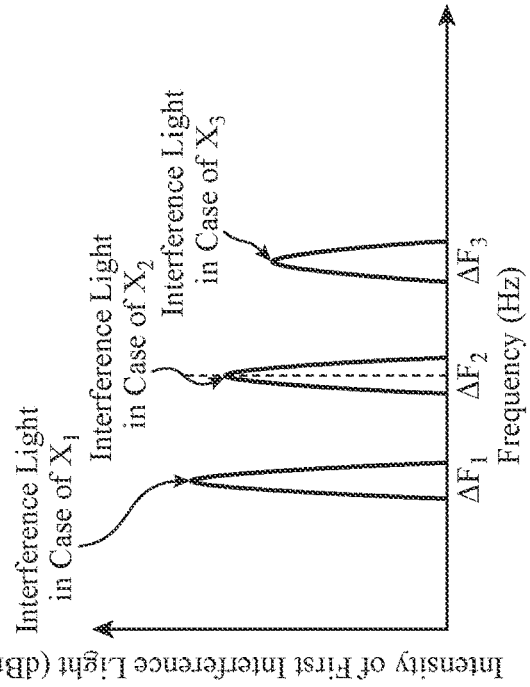
FIG. 4B is a graph illustrating waveforms of reference light before interference and first reflected light before the interference in an optical interference unit.

FIG. 4B is a graph illustrating waveforms of the reference light before the interference and the first reflected light before the interference in the optical interference unit 11 in the second example where the distance from the optical transmission unit 105 to the target object 107 is $X_2$. The vertical axis represents frequency (Hz), and the horizontal axis represents elapsed time (sec).

Due to the wavelength sweep of the laser light by the sweeping unit 2, the frequency of the reference light and the frequency of the first reflected light in the optical interference unit 11 each change with time, as in the swept light. Note that, in the first specific example, the value of variation in frequency per unit time in the swept light emitted from the sweeping unit 2 is assumed to be known.

The first reflected light in the optical interference unit 11 is delayed with respect to the reference light according to the distance between the optical transmission unit 105 and the target object 107. Therefore, as illustrated in FIG. 4B, the first reflected light in the optical interference unit 11 is delayed by a time $\Delta T_2$ with respect to the reference light.

In step ST1 described above, the intensity measurement unit 14 measures the intensity of the first interference light for each frequency on the basis of the first digital signal indicating the waveform of the first interference light generated from the reference light and the first reflected light as described above. For example, the maximum frequency of the reference light and the maximum frequency of the first reflected light are each higher frequencies on the order of THz. In that case, it is difficult for a general device that receives and detects measurement light to directly detect such high frequency light.

Therefore, in the first specific example, the optical interference unit 11 generates a difference frequency wave as interference light by performing four-wave mixing on the reference light and the first reflected light. In the example illustrated in FIG. 4B, the difference frequency wave is interference light having a frequency difference $\Delta F_2$ between the frequency $F_r$ of the reference light and the frequency $F_2$ of the first reflected light at the time point $T_1$ as a center frequency. Since the order of the $\Delta F_2$ can be reduced to an order of several MHz, the $\Delta F_2$ can be sufficiently measured by a device such as a typical balanced light-receiving photodiode.

Figure 4C:
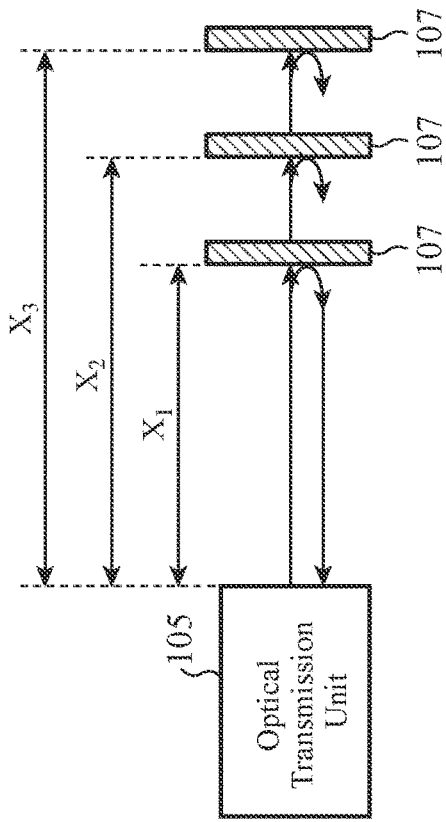
FIG. 4C is a graph illustrating a frequency spectrum of a difference frequency wave.

FIG. 4C is a graph illustrating a frequency spectrum of the difference frequency wave measured by the intensity measurement unit 14 based on the first digital signal indicating the waveform of the difference frequency wave at the time point $T_1$ illustrated in FIG. 4B. The vertical axis represents intensity (dBm), and the horizontal axis represents frequency. As illustrated in FIG. 4C, in the frequency spectrum of the difference frequency wave, the center frequency is $\Delta F_2$ described above.

Then, as illustrated in FIG. 4B, the $\Delta F_2$ is proportional to a delay $\Delta T_2$ of the first reflected light with respect to the reference light in the optical interference unit 11, and the $\Delta T_2$ is proportional to the distance $X_2$ from the optical transmission unit 105 to the target object 107.

Therefore, in step ST2 described above, the optical path length calculation unit 15 detects the center frequency $\Delta F_2$ of the difference frequency wave on the basis of the intensity of the difference frequency wave for each frequency measured by the intensity measurement unit 14, and calculates the delay $\Delta T_2$ of the first reflected light with respect to the reference light in the optical interference unit 11 on the basis of the $\Delta F_2$ and the sweep speed of the swept light corresponding to the inclination of the graphs of the reference light and the first reflected light illustrated in FIG. 4B. Then, the optical path length calculation unit 15 calculates the first optical path length from the optical transmission unit 105 to the target object 107 on the basis of the calculated $\Delta T_2$. Then, in step ST4 described above, the distance calculation unit 16 calculates the distance $X_2$ on the basis of the first optical path length.

Figure 4D:
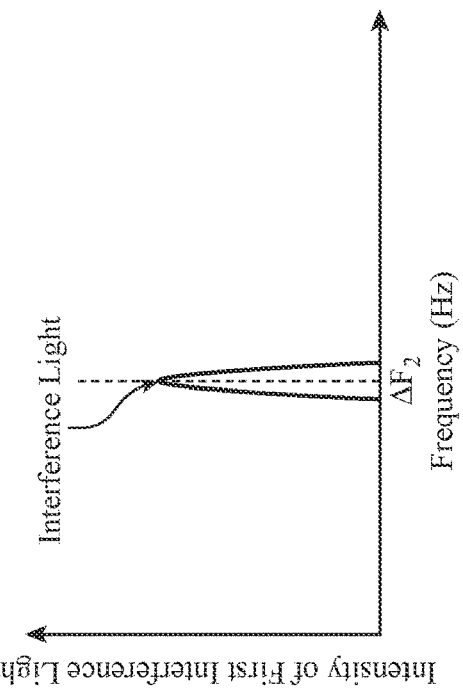
FIG. 4D is a graph illustrating frequency spectra of difference frequency waves in respective cases illustrated in FIG. 4A.

FIG. 4D is a graph illustrating frequency spectra of difference frequency waves measured based on the first digital signal in the respective cases illustrated in FIG. 4A. The vertical axis represents intensity (dBm), and the horizontal axis represents frequency (Hz).

When the distance between the optical transmission unit 105 and the target object is $X_1$ shorter than $X_2$ as illustrated in FIG. 4A, the center frequency $\Delta F_1$ of the difference frequency wave is lower than the center frequency $\Delta F_2$ of the difference frequency wave when the distance between the optical transmission unit 105 and the target object 107 is $X_2$ as illustrated in FIG. 4D. In this case, the delay of the first reflected light with respect to the reference light in the optical interference unit 11 is smaller than the delay $\Delta T_2$ in the case where the distance between the optical transmission unit 105 and the target object 107 is $X_2$.

In addition, when the distance between the optical transmission unit 105 and the target object is $X_3$ longer than $X_2$ as illustrated in FIG. 4A, the center frequency $\Delta F_3$ of the difference frequency wave is higher than the center frequency $\Delta F_2$ of the difference frequency wave when the distance between the optical transmission unit 105 and the target object 107 is $X_2$ as illustrated in FIG. 4D. In this case, the delay of the first reflected light with respect to the reference light in the optical interference unit 11 is larger than the delay $\Delta T_2$ in the case where the distance between the optical transmission unit 105 and the target object 107 is $X_2$.

Figure 5:
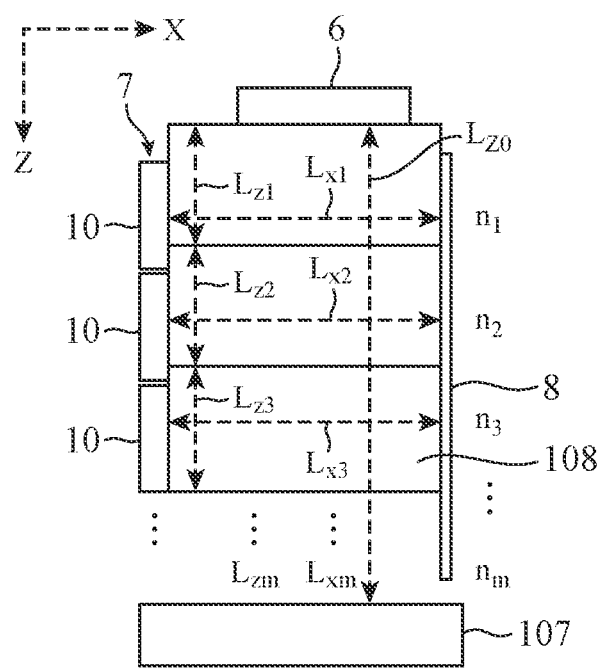
FIG. 5 is an enlarged view of a first optical system, a second optical system, and a reflection unit in the optical distance measurement device illustrated in FIG. 1.

Next, a second specific example of the distance measurement method by the optical distance measurement device 101 according to the first embodiment will be described with reference to the drawings. FIG. 5 is an enlarged view of the first optical system 6, the second optical system 7, and the reflection unit 8 in the optical distance measurement device 101 illustrated in FIG. 1. In FIG. 5, a direction parallel to the optical axis of the first measurement light emitted from the first optical system 6 is defined as a Z-axis direction, and a direction parallel to the optical axis of the second measurement light emitted from the second optical system 7 is defined as an X-axis direction.

During machining of the target object 107 by the machining unit 103, a refractive index distribution in which the refractive index varies along the Z-axis direction occurs in the distance measurement space 108 due to a temperature change of air, scattering of a mist of machining oil, or the like. In view of this, in the second specific example, the distance calculation unit 16 calculates the refractive index distribution.

As illustrated in FIG. 5, the distance measurement space 108 between the first optical system 6 and the target object 107 is assumed to have a plurality of regions arranged along the optical axis of the first optical system 6. More specifically, in the second specific example, the distance measurement space 108 is assumed to be divided into m regions that are arranged along the optical axis of the first optical system 6. Note that m is a positive integer of 2 or more.

In the second specific example, the second optical system 7 includes a plurality of optical elements 10 arranged so that the optical axis of the second measurement light emitted from each of the optical elements 10 passes through a corresponding one of the plurality of regions. Each of the plurality of optical elements 10 emits the second measurement light toward a corresponding one of the plurality of regions, and receives the second reflected light reflected by the reflection unit 8.

More specifically, the plurality of optical elements 10 includes m optical elements. The m optical elements 10 are arranged so that the optical axis of the second measurement light emitted from each of the m optical elements 10 passes through a corresponding one of the m regions.

In addition, the optical interference unit 11 generates second interference light for each region by causing interference between the second reflected light for each region received by the plurality of optical elements 10 and the reference light generated by the splitting unit 3. The optical path length calculation unit 15 calculates the second optical path length for each region on the basis of the second interference light for each region generated by the optical interference unit 11.

In addition, the distance calculation unit 16 calculates a refractive index of each region on the basis of the second optical path length of each region calculated by the optical path length calculation unit 15, calculates an average refractive index of the distance measurement space 108 on the basis of the refractive indexes of the respective regions, and calculates the distance from the emission surface of the first optical system 6 to the reflection surface of the target object 107 on the basis of the average refractive index and the first optical path length calculated by the optical path length calculation unit 15.

The distance calculation method by the distance calculation unit 16 in the second specific example will be described below in more detail. In this method, the refractive indexes of the respective regions are represented by $n_1, n_2, n_3, \ldots n_m$, the lengths of the respective regions in the Z-axis direction are represented by $L_{z1}, L_{z2}, L_{z3}, \ldots L_{zm}$, and the lengths of the respective regions in the X-axis direction are represented by $L_{x1}, L_{x2}, L_{x3}, \ldots L_{xm}$. Note that the length of each region in the X-axis direction here is a distance from the emission surface of each optical element 10 to the reflection surface of the reflection unit 8. In addition, the "length" here is not an optical path length but an actual distance. These values are measured in advance before the machining of the target object 107 by the machining unit 103.

More specifically, first, as illustrated in FIG. 5, the plurality of optical elements 10 is arranged along an axis parallel to the optical axis of the first optical system 6, and the reflection unit 8 is disposed so that the reflection surface of the reflection unit 8 is perpendicular to the optical axis of each of the plurality of optical elements 10. Next, in a state where the refractive index in the distance measurement space 108 is uniform, the optical distance measurement device 101 calculates the length in the X-axis direction of each region, which is the distance from the emission surface of each of the plurality of optical elements 10 to the reflection surface of the reflection unit 8, and the distance from the emission surface of the first optical system 6 to the irradiation surface of the target object 107 by a method similar to the abovementioned method.

More specifically, in this processing, the uniform refractive index in the distance measurement space 108 is known, and the distance calculation unit 16 of the optical distance measurement device 101 calculates the distance from the emission surface of the first optical system 6 to the reflection surface of the target object 107 on the basis of the refractive index and the first optical path length measured by the optical path length calculation unit 15. Furthermore, the distance calculation unit 16 calculates the length in the X-axis direction of each region, which is the distance from the emission surface of each of the plurality of optical elements 10 to the reflection surface of the reflection unit 8, on the basis of the refractive index and the second optical path length measured by the optical path length calculation unit 15. In addition, the optical distance measurement device 101 calculates the length of each region in the Z-axis direction on the basis of the calculated distance from the emission surface of the first optical system 6 to the irradiation surface of the target object 107. That is, $L_{x1}$, $L_{x2}$, $L_{x3}$, ... $L_{xm}$ and $L_{z1}$, $L_{z2}$, $L_{z3}$, ... $L_{zm}$ described above are measured by the optical distance measurement device 101 before the target object 107 is machined by the machining unit 103. Note that the length in the X-axis direction of each region, which is the distance from the emission surface of each of the plurality of optical elements 10 to the reflection surface of the reflection unit 8, basically does not change, and thus may be calculated or measured in advance by another method.

After the data for calibration is measured as described above, the machining of the target object 107 by the machining unit 103 is started. As described above, during the machining of the target object 107 by the machining unit 103, a refractive index distribution in which the refractive index varies in the Z-axis direction occurs in the distance measurement space 108. In a case where such a refractive index distribution occurs in the distance measurement space, the distance measurement accuracy by the optical distance measurement device 101 decreases. In view of this, the optical distance measurement device 101 calculates, by the method described below, the distance from the emission surface of the first optical system 6 to the reflection surface of the target object 107 during the machining of the target object 107 by the machining unit 103.

As described above, since the optical path length is equal to the product of the refractive index and the distance, the second optical path length calculated by the optical path length calculation unit 15 is expressed by Equation (1) below using an integer i of 1 or more and m or less.

$$L_{measure,xi} = n_i L_{xi} \qquad (1)$$

In Equation (1), $L_{measure,xi}$ represents the optical path length in the X-axis direction of each region calculated by the optical path length calculation unit 15. $L_{xi}$ is a length in the X-axis direction of each region measured in advance as described above. From Equation (1), the refractive index of each region is expressed by Equation (2) below.

$$n_i = \frac{L_{measure,xi}}{L_{xi}} \qquad (2)$$

As indicated by Equation (2), the distance calculation unit 16 calculates the refractive index of each region from the ratio between $L_{xi}$ measured in advance before the target object 107 is machined by the machining unit 103 and the second optical path length $L_{measure,xi}$ calculated by the optical path length calculation unit 15 during the machining of the target object 107 by the machining unit 103. In addition, the sum of the lengths of the respective regions in the Z-axis direction is expressed by Equation (3) below.

$$L_{z0} = \sum_{1}^{m} L_{zi} \qquad (3)$$

In Equation (3), $L_{zi}$ represents the length in the Z-axis direction of each region measured in advance as described above, and $L_{z0}$ represents the distance from the emission surface of the first optical system 6 to the reflection surface of the target object 107 calculated from $L_{zi}$. When the average refractive index $n_{ave}$ of the distance measurement space 108 is defined as a weighted average obtained by weighting the refractive index $n_i$ of each region in Equation (2) with the length $L_{zi}$ of each region in the Z-axis direction, Equation (4) below holds.

$$n_{ave} L_{z0} = \sum_{1}^{m} n_i L_{zi} \qquad (4)$$

$$\therefore n_{ave} = \frac{\sum_{1}^{m} n_1 L_{z1}}{L_{z0}}$$

As indicated by Equation (4), the distance calculation unit 16 calculates the average refractive index $n_{ave}$ of the distance measurement space 108 on the basis of the calculated refractive index $n_i$ of each region and the previously measured $L_{zi}$ as described above.

In addition, as indicated by Equation (5) below, the sum of the optical path lengths in the Z-axis direction of the respective regions, that is, the first optical path length $L_{measure,z}$ from the emission surface of the first optical system 6 to the reflection surface of the target object 107, is equal to the product of the average refractive index $n_{ave}$ of the distance measurement space 108 and the distance $L_Z$ from the emission surface of the first optical system 6 to the reflection surface of the target object 107.

$$L_{measure,z} = n_{ave} L_z \qquad (5)$$

By transforming Equation (5). Equation (6) below is obtained.

$$L_Z = \frac{L_{measure,z}}{n_{ave}} \qquad (6)$$

As indicated by Equation (6), the distance calculation unit 16 calculates the distance $L_Z$ from the emission surface of the first optical system 6 to the reflection surface of the target object 107 during the machining of the target object 107 by the machining unit 103 on the basis of the calculated average refractive index $n_{ave}$ and the first optical path length $L_{measure,z}$ calculated by the optical path length calculation unit 15.

Furthermore, in the second specific example described above, in a case where it is predicted that the refractive index distribution in the distance measurement space 108 continuously varies according to the position in the Z-axis direction, the distance calculation unit 16 may derive a function of the refractive index continuously varied according to the position in the Z-axis direction by fitting using the refractive index of each region as a fitting parameter. In that case, the distance calculation unit 16 may calculate the average refractive index of the distance measurement space 108 not by a simple weighted average as in Equation (4) but by integrating the function.

Note that, in general, in distance measurement using light, the degree of change in the refractive index in the distance measurement space 108 due to a change in temperature or a change in the concentration of a substance other than air during a period from the start and the completion of the distance measurement is very small.

More specifically, in general, a light source having a sweep speed on the order of kHz or more is widely used as a light source that emits wavelength-swept light. In a case where such a light source is used for the wavelength-swept-light output unit 104 of the optical distance measurement device 101, the optical distance measurement device 101 can perform distance measurement 1000 times per second. A degree of a change in refractive index due to a temperature change or a convection in the distance measurement space 108 during 0.001 seconds required for one distance measurement by the optical distance measurement device 101 is very small.

Therefore, the optical distance measurement device 101 can measure ever-changing refractive index of the distance measurement space 108 by performing distance measurement using light by the wavelength-swept-light output unit 104 and an optical member such as the plurality of optical elements 10 and the reflection unit 8. Therefore, the optical distance measurement device 101 can sequentially measure the distance from the emission surface of the first optical system 6 to the reflection surface of the target object 107 on the basis of the refractive index.

Hereinafter, a simulation result of a refractive index change in the distance measurement space 108 will be described. In this simulation, the reflection surface of the target object 107 is covered with an oil film layer, and the distance measurement space 108 is constituted by the oil film layer and an air layer from a surface of the oil film layer on the first optical system 6 side to the emission surface of the first optical system 6.

The thickness of the air layer in the direction along the optical axis of the first optical system 6 is 0.8 m, and the thickness of the oil film layer in the direction along the optical axis of the first optical system 6 is 0.001 m. In addition, the temperature dependence of the refractive index of the air layer is set to $3.7 \times 10^{-6}$, and the temperature dependence of the refractive index of the oil film layer is set to $3.3 \times 10^{-4}$.

When the optical distance measurement device 101 outputs a kilowatt-class high-output machining laser, the temperature of the entire machining head unit 110 rises due to stray light. In light of this, suppose that, during the machining of the target object 107 by the machining unit 103, the temperature of the layer having a thickness of 0.4 m in the air layer on the first optical system 6 side is 80° C., the temperature of the layer having a thickness of 0.4 m in the air layer on the target object 107 side is 40° C., and the temperature of the oil film layer is 40° C. The difference between the optical path length from the emission surface of the first optical system 6 to the reflection surface of the target object 107 measured in this case and the optical path length from the emission surface of the first optical system 6 to the reflection surface of the target object 107 measured in the case where the distance measurement space 108 has a room temperature of 25° C. is predicted to be 108.1 um. The optical distance measurement device 101 can correct this difference by the method described above, and thus can accurately measure the distance from the emission surface of the first optical system 6 to the reflection surface of the target object 107 during the machining of the target object 107 by the machining unit 103.

Note that the Ciddor equation is used as the value of the temperature dependence of the refractive index of air in the above simulation. In addition, as a value of the temperature dependence of the refractive index of the oil film in the above simulation, a physical property value of toluene is used. Although toluene itself is not generally used as machining oil, it is used because examples of physical property values are abundantly accumulated.

Next, a modification of the optical distance measurement device 101 according to the first embodiment will be described. The first interference light based on the first reflected light and the second interference light based on the second reflected light in the optical interference unit 11 need to be sufficiently separated to such an extent that the optical path length calculation unit 15 can detect the center frequency of each interference light.

In this regard, examples of conceivable methods include a method for splitting the first reflected light and the second reflected light incident on the optical interference unit 11 using a coupler. In this method, it is necessary to adjust the length of the optical path of the first reflected light and the length of the optical path of the second reflected light so that the optical interference unit 11 can simultaneously perform the interference between the first reflected light and the reference light and the interference between the second reflected light and the reference light at positions far enough away not to cause interference between the first reflected light and the second reflected light. However, with this method, the optical path of the first reflected light may increase due to the adjustment of the length of the optical path of the first reflected light, which may result in narrowing the range of distance measurable by the optical distance measurement device 101.

In this regard, in the modification, the optical distance measurement device 101 includes, as the measurement light splitting unit 5, an optical switch that can switch the optical path of the measurement light at high speed. The optical switch guides the first measurement light to the first optical system 6 by switching the optical path of the measurement light to the optical path from the optical switch to the first optical system 6, or guides the second measurement light to the second optical system 7 by switching the optical path of the measurement light to the optical path from the optical switch to the second optical system 7. Note that the optical switch performs switching at a frequency lower than the sweep frequency of the swept light emitted from the wavelength-swept-light output unit 104.

As a result, the first reflected light and the second reflected light are separated temporally, not spatially, and the optical interference unit 11 can perform the interference between the first reflected light and the reference light and the interference between the second reflected light and the reference light each at different times. Thus, the first interference light and the second interference light are temporally separated. Accordingly, the optical path length calculation unit 15 can accurately detect the center frequency of each interference light. Thus, the distance calculation unit 16 can accurately measure the distance from the emission surface of the first optical system 6 to the reflection surface of the target object 107.

Figure 6A:
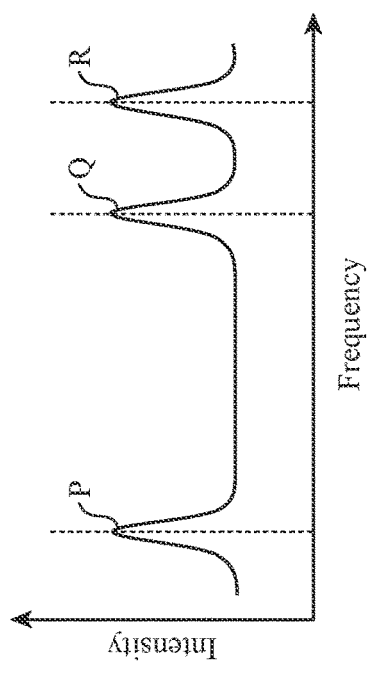
FIG. 6A is a graph illustrating a frequency spectrum of first interference light and a frequency spectrum of second interference light in the optical interference unit in a case where the optical distance measurement device includes an optical element that spatially splits measurement light into first measurement light and second measurement light.

FIG. 6A is a graph illustrating the frequency spectrum of the first interference light and the frequency spectrum of the second interference light in the optical interference unit 11 in a case where the optical distance measurement device 101 includes, as the measurement light splitting unit 5, an optical element that spatially splits measurement light into first measurement light and second measurement light. In FIG. 6A, the vertical axis represents intensity, and the horizontal axis represents frequency. In FIG. 6A, two frequency spectra of the second interference light are illustrated corresponding to two optical elements 10 among the plurality of optical elements 10 constituting the second optical system 7.

The frequency spectrum P of the first interference light, the frequency spectrum Q of the second interference light, and the frequency spectrum R of the second interference light need to be sufficiently separated so that the optical path length calculation unit 15 can detect the center frequency of each interference light.

Figure 6B:
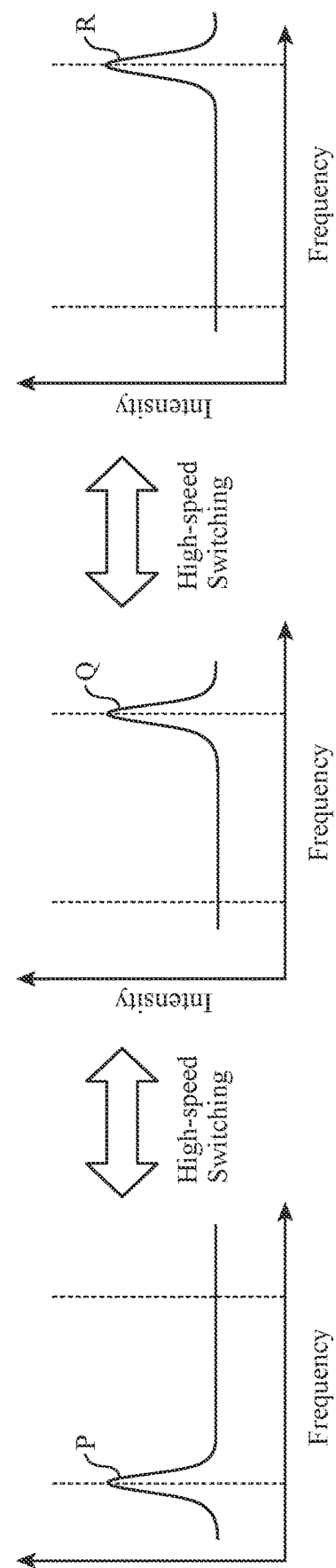
FIG. 6B is a graph illustrating a frequency spectrum of first interference light and a frequency spectrum of second interference light in the optical interference unit in a case where the optical distance measurement device includes an optical switch that temporally splits measurement light into first measurement light and second measurement light.

FIG. 6B is a graph illustrating the frequency spectrum of the first interference light and the frequency spectrum of the second interference light in the optical interference unit 11 when the optical distance measurement device 101 includes, as the measurement light splitting unit 5, an optical switch that temporally splits the measurement light into first measurement light and second measurement light. In FIG. 6B, the vertical axis of each graph represents intensity, and the horizontal axis of each graph represents frequency.

The left graph of FIG. 6B illustrates the frequency spectrum of the first interference light in the optical interference unit 11 when the optical switch guides the first measurement light to the first optical system 6 by switching the optical path of the measurement light to the optical path from the optical switch to the first optical system 6.

The graph in the middle of FIG. 6B illustrates the frequency spectrum of the second interference light in the optical interference unit 11 when the optical switch guides the second measurement light to a first optical element among the plurality of optical elements 10 by switching the optical path of the measurement light to the optical path from the optical switch to the first optical element.

The graph in the right of FIG. 6B illustrates the frequency spectrum of the second interference light in the optical interference unit 11 when the optical switch guides the second measurement light to a second optical element among the plurality of optical elements 10 by switching the optical path of the measurement light to the optical path from the optical switch to the second optical element.

As illustrated in FIG. 6B, the first interference light and the second interference light are temporally separated. Therefore, the optical path length calculation unit 15 can accurately detect the center frequency of each interference light, and the distance calculation unit 16 can accurately measure the distance from the emission surface of the first optical system 6 to the reflection surface of the target object 107.

As described above, the optical distance measurement device 101 according to the first embodiment includes: the splitting unit 3 to split laser light into measurement light and reference light, the measurement light splitting unit 5 to split the measurement light generated by the splitting unit 3 into first measurement light and second measurement light; the first optical system 6 to irradiate a target object with the first measurement light generated by the measurement light splitting unit 5 and to receive first reflected light reflected by the target object; the second optical system 7 to emit the second measurement light generated by the measurement light splitting unit 5 toward the distance measurement space 108 between the first optical system 6 and the target object 107; the reflection unit 8 to reflect the second measurement light emitted from the second optical system 7 and passing through the distance measurement space 108 toward the second optical system 7; the optical path length calculation unit 15 to calculate a first optical path length from the emission surface of the first optical system 6 to the reflection surface of the target object 107 on the basis of the first reflected light received by the first optical system 6 and the reference light generated by the splitting unit 3, and to calculate a second optical path length from the emission surface of the second optical system 7 to the reflection surface of the reflection unit 8 on the basis of second reflected light reflected by the reflection unit 8 and received by the second optical system 7 and the reference light generated by the splitting unit 3; and the distance calculation unit 16 to calculate a refractive index of the distance measurement space 108 on the basis of the second optical path length measured by the optical path length calculation unit 15, and to calculate a distance from the emission surface of the first optical system 6 to the reflection surface of the target object 107 on the basis of the refractive index and the first optical path length measured by the optical path length calculation unit 15.

According to the above configuration, the refractive index of the distance measurement space 108 is calculated on the basis of the second optical path length from the emission surface of the second optical system 7 to the reflection surface of the reflection unit 8, and the distance from the emission surface of the first optical system 6 to the reflection surface of the target object 107 is calculated on the basis of the refractive index and the first optical path length from the emission surface of the first optical system 6 to the reflection surface of the target object 107. Thus, when the refractive index of the distance measurement space 108 changes, the distance from the emission surface of the first optical system 6 to the reflection surface of the target object 107 can be calculated on the basis of the measured refractive index of the distance measurement space 108. Accordingly, it is possible to suppress a decrease in distance measurement accuracy due to a change in the refractive index of the distance measurement space 108.

In addition, the optical distance measurement device 101 according to the first embodiment further includes the optical interference unit 11 that generates first interference light by causing interference between the first reflected light received by the first optical system 6 and the reference light generated by the splitting unit 3, and generates second interference light by causing interference between the second reflected light obtained by reflecting the second measurement light by the reflection unit 8 and received by the second optical system 7 and the reference light generated by the splitting unit 3, wherein the optical path length calculation unit 15 calculates the first optical path length from the emission surface of the first optical system 6 to the reflection surface of the target object 107 on the basis of the first interference light generated by the optical interference unit 11, and calculates the second optical path length from the emission surface of the second optical system 7 to the reflection surface of the reflection unit 8 on the basis of the second interference light generated by the optical interference unit 11.

According to the above configuration, the first optical path length can be optimally calculated on the basis of the first interference light between the first reflected light and the reference light, and the second optical path length can be optimally calculated on the basis of the second interference light between the second reflected light and the reference light. Therefore, it is possible to optimally calculate the distance from the emission surface of the first optical system 6 to the reflection surface of the target object 107, and thus, it is possible to suppress a decrease in the distance measurement accuracy due to a change in the refractive index of the distance measurement space 108.

In addition, in the optical distance measurement device 101 according to the first embodiment, the distance measurement space 108 includes a plurality of regions arranged along an optical axis of the first optical system 6, the second optical system 7 includes a plurality of optical elements 10 arranged so that an optical axis of the second measurement light to be emitted from each of the optical elements 10 passes through a corresponding region of the plurality of regions, each of the plurality of optical elements 10 emits the second measurement light toward the corresponding region of the plurality of regions and receives the second reflected light reflected by the reflection unit, the optical interference unit 1I generates the second interference light for each region by causing interference between the second reflection light for each region received by the plurality of optical elements 10 and the reference light, the optical path length calculation unit 15 calculates the second optical path length of each region on the basis of the second interference light for each region generated by the optical interference unit 11, and the distance calculation unit 16 calculates a refractive index of each region on the basis of the second optical path length of each region calculated by the optical path length calculation unit 15, calculates an average refractive index of the distance measurement space 108 on the basis of the refractive index of each region, and calculates the distance from the emission surface of the first optical system 6 to the reflection surface of the target object 107 on the basis of the average refractive index and the first optical path length.

According to the above configuration, the second optical path length of each region is calculated. Then, the refractive index of each region is calculated on the basis of the second optical path length of each region, and the distance from the emission surface of the first optical system 6 to the reflection surface of the target object 107 is calculated on the basis of the refractive index of each region and the first optical path length from the emission surface of the first optical system 6 to the reflection surface of the target object 107. As a result, in a case where the refractive index of the distance measurement space 108 changes and a refractive index distribution occurs in the distance measurement space 108, the distance from the emission surface of the first optical system 6 to the reflection surface of the target object 107 can be calculated on the basis of the measured refractive index of each region in the distance measurement space 108. Therefore, it is possible to suppress a decrease in distance measurement accuracy due to an occurrence of a refractive index distribution in the distance measurement space caused by a change in the refractive index of the distance measurement space 108.

Further, in the optical distance measurement device 101 according to the first embodiment, the laser light is wavelength-swept light, the optical interference unit 11 generates, as the first interference light, a first difference frequency wave by causing interference between the first reflected light and the reference light, and generates, as the second interference light, a second difference frequency wave by causing interference between the second reflected light and the reference light, and the optical path length calculation unit 15 calculates the first optical path length on the basis of the first difference frequency wave generated by the optical interference unit 11, and calculates the second optical path length on the basis of the second difference frequency wave generated by the optical interference unit 11.

According to the above configuration, the first optical path length can desirably be calculated on the basis of the first difference frequency wave that is the first interference light between the first reflected light and the reference light, and the second optical path length can desirably be calculated on the basis of the second difference frequency wave that is the second interference light between the second reflected light and the reference light. Therefore, it is possible to desirably calculate the distance from the emission surface of the first optical system 6 to the reflection surface of the target object 107, and thus, it is possible to suppress a decrease in the distance measurement accuracy due to a change in the refractive index of the distance measurement space 108.

In addition, the machining device 100 according to the first embodiment includes: the optical distance measurement device 101; the machining unit 103 to machine the target object 107, and the machining control unit 102 to control the machining unit 103 so that the machining unit 103 machines the target object 107 on the basis of the distance measured by the optical distance measurement device 101.

According to the above configuration, even when the refractive index of the distance measurement space 108 changes, the distance from the emission surface of the first optical system 6 to the reflection surface of the target object 107 can be calculated on the basis of the measured refractive index of the distance measurement space 108, and the target object 107 can be machined on the basis of the distance. Accordingly, it is possible to suppress a decrease in distance measurement accuracy due to a change in the refractive index of the distance measurement space 108, and the machining precision of the target object 107 can be improved.

Second Embodiment

The first embodiment has described the configuration in which the wavelength-swept-light output unit 104 that outputs swept light is used as the light source of the measurement light and the reference light. In a second embodiment, a configuration using a white laser light source that outputs white light as a light source of measurement light and reference light is described.

Figure 7:
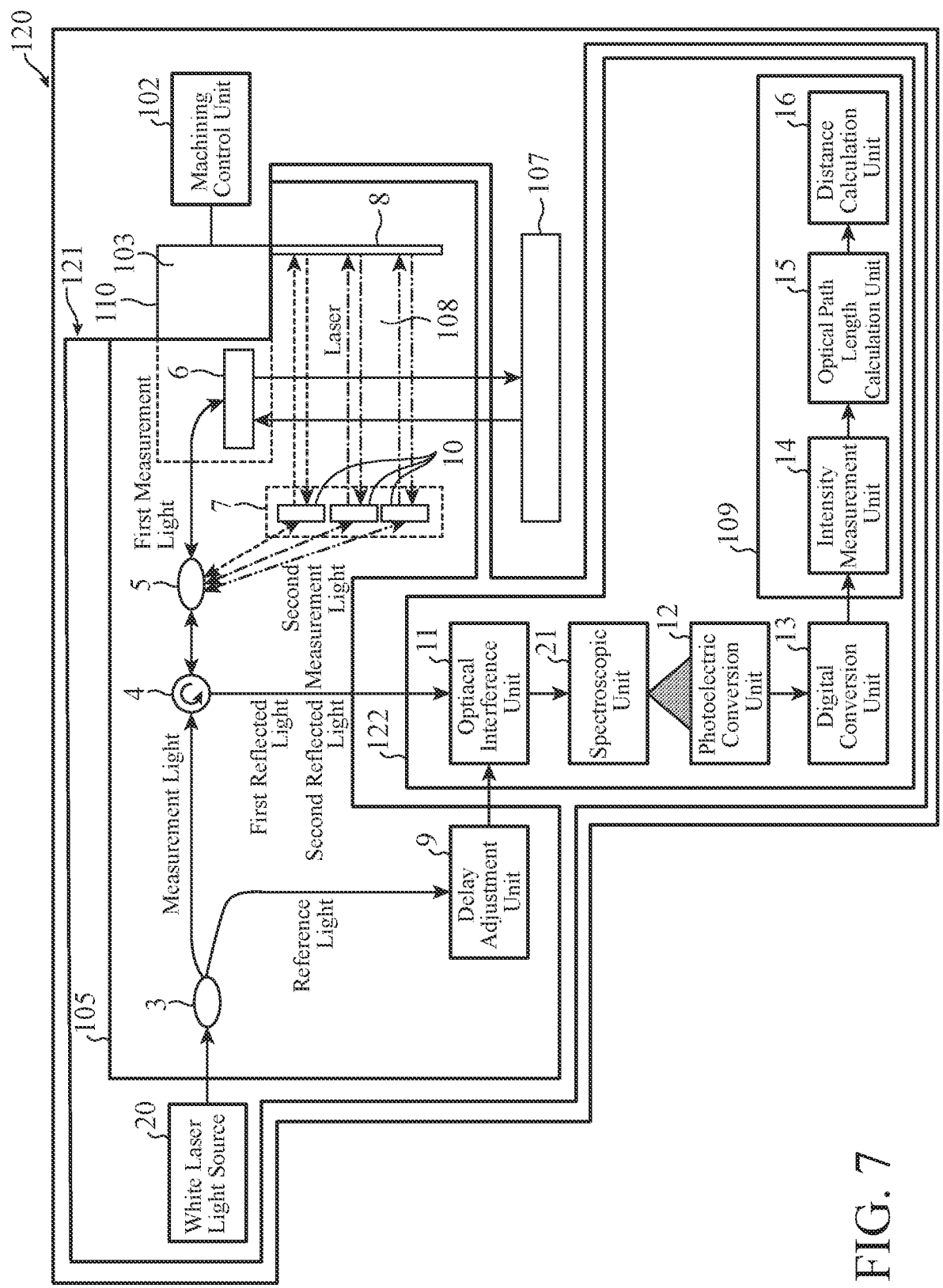
FIG. 7 is a diagram illustrating a configuration of a machining device including an optical distance measurement device according to a second embodiment.

The second embodiment will be described below with reference to the drawings. Note that components having functions similar to those described in the first embodiment are denoted by the same reference numerals, and the description thereof will be omitted. FIG. 7 is a diagram illustrating a configuration of a machining device 120 including an optical distance measurement device 121 according to the second embodiment. As illustrated in FIG. 7, the optical distance measurement device 121 includes a white laser light source 20 instead of the wavelength-swept-light output unit 104, and the signal processing unit 122 further includes a spectroscopic unit 21, as compared with the optical distance measurement device 101 according to the first embodiment.

The white laser light source 20 emits continuous-wave laser light. For example, the white laser light source 20 is an amplified spontaneous emission (ASE) light source or the like.

Note that, although the second embodiment describes the configuration in which the optical distance measurement device 121 includes the white laser light source 20, the optical distance measurement device 121 may not include the white laser light source 20. In that case, the optical distance measurement device 121 may use laser light emitted from an external laser light generator including the white laser light source 20.

In the second embodiment, a splitting unit 3 splits the laser light emitted from the white laser light source 20 into measurement light and reference light. That is, each of the measurement light, the reference light, first measurement light and second measurement light generated by splitting the measurement light by a measurement light splitting unit 5, first reflected light obtained by reflecting the measurement light, which is emitted from a first optical system 6 to a target object 107, on the target object 107, and second reflected light obtained by reflecting the measurement light, which is emitted from a second optical system 7 toward a reflection unit 8, on the reflection unit 8 is continuous-wave laser light.

Therefore, in the second embodiment, an optical interference unit 11 generates first interference light by causing interference between the continuous-wave first reflected light and the continuous-wave reference light. In addition, the optical interference unit 11 generates second interference light by causing interference between the continuous-wave second reflected light and the continuous-wave reference light.

The spectroscopic unit 21 spectrally disperses the first interference light generated by the optical interference unit 11. The first interference light dispersed by the spectroscopic unit 21 is spatially separated for each frequency. In addition, the spectroscopic unit 21 spectrally disperses the second interference light generated by the optical interference unit 11. The second interference light dispersed by the spectroscopic unit 21 is spatially separated for each frequency. The spectroscopic unit 21 is, for example, a diffraction grating or the like.

More specifically, in the second embodiment, a photoelectric conversion unit 12 includes a plurality of photoelectric elements (not illustrated). Each of the plurality of photoelectric elements photoelectrically converts the first interference light dispersed by the spectroscopic unit 21 to generate a first analog signal indicating the intensity of the first interference light associated with the arrangement of each photoelectric element. More specifically, the photoelectric conversion unit 12 includes, for example, a plurality of photoelectric elements arranged in an array like a CCD. The arrangement of each of the plurality of photoelectric elements corresponds to a frequency of light to be received. The plurality of photoelectric elements photoelectrically converts the first interference light spatially separated for each frequency, thereby generating a first analog signal indicating the intensity of the first interference light associated with the arrangement of each of the photoelectric elements.

In addition, in the second embodiment, each of the plurality of photoelectric elements in the photoelectric conversion unit 12 photoelectrically converts the second interference light dispersed by the spectroscopic unit 21, thereby generating a second analog signal indicating the intensity of the second interference light associated with the arrangement of each photoelectric element. More specifically, the plurality of photoelectric elements photoelectrically converts the second interference light spatially separated for each frequency to generate a second analog signal indicating the intensity of the second interference light associated with the arrangement of each photoelectric element.

In the second embodiment, a digital conversion unit 13 performs A/D conversion on the first analog signal generated by the photoelectric conversion unit 12 to generate a first digital signal indicating the intensity of the first interference light associated with the arrangement of each photoelectric element. In addition, the digital conversion unit 13 performs A/D conversion on the second analog signal generated by the photoelectric conversion unit 12 to generate a second digital signal indicating the intensity of the second interference light associated with the arrangement of each photoelectric element.

In the second embodiment, an intensity measurement unit 14 acquires, from a storage unit (not illustrated), information indicating the correspondence between the arrangement of each photoelectric element in the photoelectric conversion unit 12 and the frequency of light to be received by each photoelectric element. The intensity measurement unit 14 measures the intensity of the first interference light for each frequency on the basis of the information and the first digital signal generated by the digital conversion unit 13. Furthermore, in the second embodiment, the intensity measurement unit 14 measures the intensity of the second interference light for each frequency on the basis of the information indicating the correspondence between the arrangement of each photoelectric element in the photoelectric conversion unit 12 and the frequency of light received by each photoelectric element and the second digital signal generated by the digital conversion unit 13.

In the second embodiment, an optical path length calculation unit 15 calculates a first optical path length from the emission surface of the first optical system 6 to the reflection surface of the target object 107 on the basis of the first interference light dispersed by the spectroscopic unit 21. In addition, in the second embodiment, the optical path length calculation unit 15 calculates a second optical path length from the emission surface of the second optical system 7 to the reflection surface of the reflection unit 8 on the basis of the second interference light dispersed by the spectroscopic unit 21. More specifically, in the second embodiment, the optical path length calculation unit 15 calculates the first optical path length from the emission surface of the first optical system 6 to the reflection surface of the target object 107 on the basis of the intensity of the first interference light for each frequency measured by the intensity measurement unit 14. In addition, the optical path length calculation unit 15 calculates the second optical path length from the emission surface of the second optical system 7 to the reflection surface of the reflection unit 8 on the basis of the intensity of the second interference light for each frequency measured by the intensity measurement unit 14.

Although not illustrated, the distance measurement method by an analysis unit 109 of the optical distance measurement device 121 according to the second embodiment is different from the distance measurement method by the analysis unit 109 of the optical distance measurement device 101 according to the first embodiment in the following points. First, in the second embodiment, in step ST1 described above, the intensity measurement unit 14 measures the intensity of the first interference light for each frequency on the basis of the information indicating the correspondence between the arrangement of each photoelectric element in the photoelectric conversion unit 12 and the frequency of light received by each photoelectric element and the first digital signal generated by the digital conversion unit 13.

In addition, in the second embodiment, in step ST1 described above, the intensity measurement unit 14 measures the intensity of the second interference light for each frequency on the basis of the information indicating the correspondence between the arrangement of each photoelectric element in the photoelectric conversion unit 12 and the frequency of light received by each photoelectric element and the second digital signal generated by the digital conversion unit 13.

Next, in step ST2 described above, the optical path length calculation unit 15 calculates the first optical path length from the emission surface of the first optical system 6 to the reflection surface of the target object 107 on the basis of the intensity of the first interference light for each frequency measured by the intensity measurement unit 14, and calculates the second optical path length from the emission surface of the second optical system 7 to the reflection surface of the reflection unit 8 on the basis of the intensity of the second interference light for each frequency measured by the intensity measurement unit 14.

More specifically, in the second embodiment, in step ST2 described above, the optical path length calculation unit 15 calculates the first optical path length from the emission surface of the first optical system 6 to the reflection surface of the target object 107 on the basis of the intensity of the first interference light for each frequency measured by the intensity measurement unit 14 by a method similar to a method used for a spectral domain optical coherence tomography which is a well-known technique.

In addition, in the second embodiment, in step ST2 described above, the optical path length calculation unit 15 calculates the second optical path length from the emission surface of the second optical system 7 to the reflection surface of the reflection unit 8 on the basis of the intensity of the second interference light for each frequency measured by the intensity measurement unit 14 by a method similar to a method used for a spectral domain optical coherence tomography which is a well-known technique. Note that the method for measuring an optical path length by a spectral domain optical coherence tomography is known, and thus the description thereof will be omitted.

Next, in step ST3 described above, a distance calculation unit 16 calculates the refractive index of a distance measurement space 108 on the basis of the second optical path length measured by the optical path length calculation unit 15. Next, in step ST4 described above, the distance calculation unit 16 calculates the distance from the emission surface of the first optical system 6 to the reflection surface of the target object 107 on the basis of the refractive index calculated in step ST3 and the first optical path length measured by the optical path length calculation unit 15.

Each function of the intensity measurement unit 14, the optical path length calculation unit 15, and the distance calculation unit 16 in the analysis unit 109 of the optical distance measurement device 121 according to the second embodiment is implemented by a processing circuit. That is, the analysis unit 109 of the optical distance measurement device 121 according to the second embodiment includes a processing circuit for executing the processing of each step described above. The processing circuit may be dedicated hardware, or may be a central processing unit (CPU) that executes a program stored in a memory. A hardware configuration for implementing the function of the analysis unit 109 of the optical distance measurement device 121 according to the second embodiment is similar to the hardware configuration illustrated in FIG. 3A. In addition, a hardware configuration for executing software that implements the function of the analysis unit 109 of the optical distance measurement device 121 according to the second embodiment is similar to the hardware configuration illustrated in FIG. 3B.

As described above, in the optical distance measurement device 121 according to the second embodiment, the laser light is white laser light, the optical distance measurement device 121 further includes the spectroscopic unit 21 that spectrally disperses the first interference light generated by the optical interference unit 11 and spectrally disperses the second interference light generated by the optical interference unit 11, and the optical path length calculation unit 15 calculates the first optical path length from the emission surface of the first optical system 6 to the reflection surface of the target object 107 on the basis of the first interference light dispersed by the spectroscopic unit 21, and calculates the second optical path length from the emission surface of the second optical system 7 to the reflection surface of the reflection unit 8 on the basis of the second interference light dispersed by the spectroscopic unit 21.

According to the above configuration, the first optical path length can be optimally calculated on the basis of the dispersed first interference light, and the second optical path length can be optimally calculated on the basis of the dispersed second interference light. Therefore, it is possible to optimally calculate the distance from the emission surface of the first optical system 6 to the reflection surface of the target object 107, and thus, it is possible to suppress a decrease in the distance measurement accuracy due to a change in the refractive index of the distance measurement space 108.

It is to be noted that two or more of the above embodiments can be freely combined, or any component in the embodiments can be modified or omitted, within the scope of the present invention.

INDUSTRIAL APPLICABILITY

The optical distance measurement device according to the present invention can suppress a decrease in distance measurement accuracy due to a change in the refractive index of the distance measurement space, and thus can be used for a machining device that machines a target object.

REFERENCE SIGNS LIST

1 laser light source
2 sweeping unit
3 splitting unit
4 optical circulator
5 measurement light splitting unit
6 first optical system
7 second optical system
8 reflection unit
9 delay adjustment unit
10 optical element
11 optical interference unit
12 photoelectric conversion unit
13 digital conversion unit
14 intensity measurement unit
15 optical path length calculation unit
16 distance calculation unit
20 white laser light source
21 spectroscopic unit
100 machining device
101 optical distance measurement device
102 machining control unit
103 machining unit
104 wavelength-swept-light output unit
105 optical transmission unit
106 signal processing unit 107 target object
108 distance measurement space
109 analysis unit
110 machining head unit
111 processing circuit
112 processor
113 memory
120 machining device
121 optical distance measurement device
122 signal processing unit

The invention claimed is:

1. An optical distance measurement device comprising:
a splitter to split laser light into measurement light and reference light;
a measurement light splitter to split the measurement light generated by the splitter into first measurement light and second measurement light;
a first optical system to irradiate a target object with the first measurement light generated by the measurement light splitter and to receive first reflected light reflected by the target object;
a second optical system to emit the second measurement light generated by the measurement light splitter toward a space between the first optical system and the target object;
a reflector to reflect the second measurement light emitted from the second optical system and passing through the space toward the second optical system;
and processing circuitry
to calculate a first optical path length from an emission surface of the first optical system to a reflection surface of the target object on the basis of the first reflected light received by the first optical system and the reference light generated by the splitter, and to calculate a second optical path length from an emission surface of the second optical system to a reflection surface of the reflector on the basis of second reflected light reflected by the reflector and received by the second optical system and the reference light generated by the splitter; and
to calculate a refractive index of the space on the basis of the second optical path length, and to calculate a distance from the emission surface of the first optical system to the reflection surface of the target object on the basis of the refractive index and the first optical path length.

2. The optical distance measurement device according to claim 1, further comprising an optical interference device to generate first interference light by causing interference between the first reflected light received by the first optical system and the reference light generated by the splitter, and to generate second interference light by causing interference between the second reflected light obtained by reflecting the second measurement light by the reflector and received by the second optical system and the reference light generated by the splitter, wherein
the processing circuitry calculates the first optical path length on the basis of the first interference light generated by the optical interference device, and calculates the second optical path length on the basis of the second interference light generated by the optical interference device.

3. The optical distance measurement device according to claim 2, wherein
the space includes a plurality of regions arranged along an optical axis of the first optical system,
the second optical system includes a plurality of optical elements disposed so that an optical axis of the second measurement light to be emitted from each of the plurality of optical elements passes through a corresponding region among the plurality of regions,
each of the plurality of optical elements emits the second measurement light toward the corresponding region among the plurality of regions and receives the second reflected light reflected by the reflector,
the optical interference device generates the second interference light for each of the plurality of regions by causing interference between the second reflected light for each of the plurality of regions received by the plurality of optical elements and the reference light,
the processing circuitry calculates the second optical path length of each of the plurality of regions on the basis of the second interference light for each of the plurality of regions generated by the optical interference device, and
the processing circuitry calculates a refractive index of each of the plurality of regions on the basis of the second optical path length of each of the plurality of regions, calculates an average refractive index of the space on the basis of the refractive index of each of the plurality of regions, and calculates the distance on the basis of the average refractive index and the first optical path length.

4. The optical distance measurement device according to claim 2, wherein the laser light is wavelength-swept light,
the optical interference device generates, as the first interference light, a first difference frequency wave by causing interference between the first reflected light and the reference light, and generates, as the second interference light, a second difference frequency wave by causing interference between the second reflected light and the reference light, and
the processing circuitry calculates the first optical path length on the basis of the first difference frequency wave generated by the optical interference device, and calculates the second optical path length on the basis of the second difference frequency wave generated by the optical interference device.

5. The optical distance measurement device according to claim 2, wherein the laser light is white laser light,
the optical distance measurement device further includes a spectroscopic device to spectrally disperse the first interference light generated by the optical interference device and spectrally disperse the second interference light generated by the optical interference device, and
the processing circuitry calculates the first optical path length on the basis of the first interference light dispersed by the spectroscopic device, and calculates the second optical path length on the basis of the second interference light dispersed by the spectroscopic device.

6. A machining device comprising;
the optical distance measurement device according to claim 1;
a machining device to machine the target object; and
a machining control device to control the machining device so that the machining device machines the target object on the basis of the distance measured by the optical distance measurement device.

* * * * *